(12) United States Patent
Olson et al.

(10) Patent No.: US 9,613,040 B2
(45) Date of Patent: *Apr. 4, 2017

(54) FILE SYSTEM SNAPSHOT DATA MANAGEMENT IN A MULTI-TIER STORAGE ENVIRONMENT

(71) Applicant: International Business Machines Corporation, Armonk, NY (US)

(72) Inventors: John T. Olson, Tucson, AZ (US); Sandeep R. Patil, Pune (IN); Riyazahamad M. Shiraguppi, Pune (IN); Gail A. Spear, Tucson, AZ (US)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 15/080,492

(22) Filed: Mar. 24, 2016

(65) Prior Publication Data

US 2016/0210067 A1 Jul. 21, 2016

Related U.S. Application Data

(63) Continuation of application No. 14/248,125, filed on Apr. 8, 2014, now Pat. No. 9,323,462.

(51) Int. Cl.
*G06F 12/00* (2006.01)
*G06F 17/30* (2006.01)
*G06F 3/06* (2006.01)

(52) U.S. Cl.
CPC ........ *G06F 17/30088* (2013.01); *G06F 3/064* (2013.01); *G06F 3/065* (2013.01); *G06F 3/067* (2013.01); *G06F 3/0619* (2013.01); *G06F 3/0688* (2013.01); *G06F 3/0689* (2013.01); *G06F 17/30221* (2013.01)

(58) Field of Classification Search
CPC .. G06F 3/0619; G06F 17/30221; G06F 3/067; G06F 17/30088; G06F 3/065
See application file for complete search history.

(56) References Cited

U.S. PATENT DOCUMENTS

| | | | |
|---|---|---|---|
| 7,379,954 | B2 | 5/2008 | Shoens |
| 7,739,241 | B2 | 6/2010 | Boutcher |
| 8,380,942 | B1 | 2/2013 | Corddry et al. |
| 9,323,462 | B2 | 4/2016 | Olson et al. |
| 2003/0159007 | A1 | 8/2003 | Sawdon et al. |
| 2008/0256311 | A1 | 10/2008 | Lee |

(Continued)

OTHER PUBLICATIONS

Olson et al., U.S. Appl. No. 15/080,489, filed Mar. 24, 2016.

(Continued)

*Primary Examiner* — John A Lane
(74) *Attorney, Agent, or Firm* — Zilka-Kotab, PC

(57) ABSTRACT

In one embodiment, a method for managing data includes receiving a request to write data to a file block on a multi-tier file system. A first logical block is associated with the file block. The method also includes determining whether the request is a first write request for the file block after creation of a snapshot of the file block. Moreover, the method includes determining an access request count for the first logical block prior to creation of the snapshot by retrieving the access request count for the first logical block from a snapshot data table accessible to an automatic tiering module. Other methods for managing data are presented in accordance with other embodiments.

15 Claims, 10 Drawing Sheets

(56) References Cited

U.S. PATENT DOCUMENTS

| | | |
|---|---|---|
| 2009/0132621 A1 | 5/2009 | Jensen et al. |
| 2009/0204650 A1 | 8/2009 | Wong et al. |
| 2011/0191555 A1 | 8/2011 | Narayanan |
| 2013/0024650 A1 | 1/2013 | Ambat et al. |
| 2015/0006787 A1 | 1/2015 | Liu et al. |
| 2015/0286436 A1 | 10/2015 | Olson et al. |
| 2016/0210299 A1 | 7/2016 | Olson et al. |

OTHER PUBLICATIONS

List of IBM Patents or Patent Applications Treated as Related.
Olson et al., U.S. Appl. No. 14/248,125, filed Apr. 8, 2014.
Notice of Allowance from U.S. Appl. No. 14/248,125, dated Jan. 25, 2016.
Non-Final Office Action from U.S. Appl. No. 15/080,489, dated May 11, 2016.
Final Office Action from U.S. Appl. No. 15/080,489, dated Aug. 30, 2016.
Notice of Allowance from U.S. Appl. No. 15/080,489, dated Nov. 22, 2016.

FILE SYSTEM SNAPSHOT DATA MANAGEMENT IN A MULTI-TIER STORAGE ENVIRONMENT

BACKGROUND

The present invention relates to management of a multi-tier storage environment, and more specifically, this invention relates to efficient management of high performance tiers in a multi-tier storage environment.

A file system defines how files are named and manages how they are placed for storage and retrieval. File system functionality may be divided into two components: a user component and a storage component. The user component is responsible for managing files within directories, file path traversals, and user access to files. The storage component of the file system determines how files are stored physically on the storage device.

A file system snapshot is a common industry term denoting the ability to record the data of a storage device or file system at any given moment. A snapshot primarily creates a point-in-time copy of data. Typically, a snapshot copy is performed instantly and made available for use by other applications, such as data protection, data analysis and reporting, and data replication applications, among others. The original copy of the data continues to be available to the applications without interruption, while the snapshot copy is used to perform other functions on the data. Snapshot copies enable better application availability, faster recovery, easier back up management of large volumes of data, reduces exposure to data loss, virtually eliminates the need for backup windows, and lowers total cost of ownership (TCO).

Copy-On-Write (COW) follows a simple principle: as long as multiple programs need read-only access to a data structure, providing these programs with pointers which point to the same data structure, instead of copying the whole structure to a new data structure, is sufficient to satisfy these programs needs. If at least one of the programs needs, at some point in the future, write access to the data structure, then a private copy may be created for it. When using a COW-based file system, offering snapshot support is straight-forward.

SUMMARY

In one embodiment, a method for managing data includes receiving a request to write data to a file block on a multi-tier file system. A first logical block is associated with the file block. The method also includes determining whether the request is a first write request for the file block after creation of a snapshot of the file block. Moreover, in response to a determination that the request is the first write request for the file block after creation of the snapshot of the file block, the method includes creating a second logical block according to copy-on-write processing, determining a measure of access requests to be directed to a logical block allocated for the snapshot versus a logical block allocated for new data on the file block, wherein the logical block allocated for the snapshot and the logical block allocated for new data on the file block are uniquely chosen from: the first logical block and the second logical block, determining whether to send the measure of access requests to an automatic tiering module, and sending the measure of access requests to the automatic tiering module in response to a determination to send the measure of access requests to the automatic tiering module.

In another embodiment, a method for managing data includes receiving a request to write data to a file block on a multi-tier file system. A first logical block is associated with the file block. The method also includes determining whether the request is a first write request for the file block after creation of a snapshot of the file block. Moreover, the method includes determining an access request count for the first logical block prior to creation of the snapshot by retrieving the access request count for the first logical block from a snapshot data table accessible to an automatic tiering module.

Other aspects and embodiments of the present invention will become apparent from the following detailed description, which, when taken in conjunction with the drawings, illustrate by way of example the principles of the invention.

DETAILED DESCRIPTION

Figure 1A:
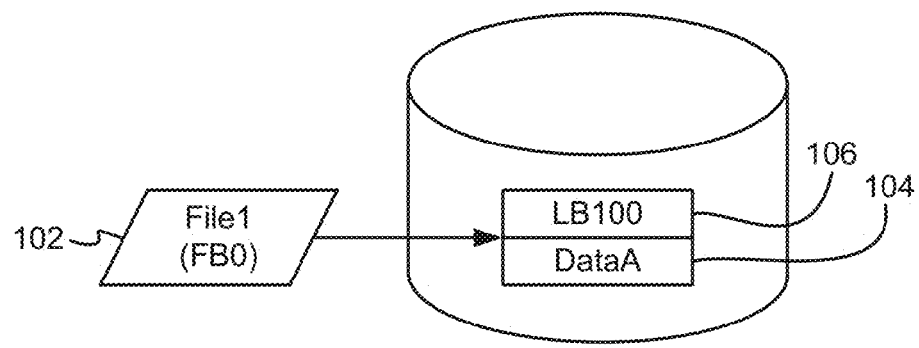
FIGS. 1A-1C illustrate snapshot creation in a file system, in one example.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of systems, methods, and computer program products for efficient management of higher tiers in a multi-tiered file system, particularly with regard to snapshot utilization.

In one general embodiment, a method for managing data including creating a second logical block on a multi-tier file system, the second logical block referencing data that is associated with a first logical block, determining a measure of access requests that will be directed to the data via the second logical block versus the first logical block, and transferring a proportion of a heatmap value for the data between the first logical block and the second logical block based on the measure of accesses that will be directed to the data via the second logical block versus the first logical block.

In another general embodiment, a computer program product for managing data including a computer readable storage medium having program code embodied therewith, the program code readable and/or executable by a processor to cause the processor to receive, by the processor, a request to write data to a file block on a multi-tier file system, wherein a first logical block is associated with the file block, determine, by the processor, whether the request is a first write request for the file block after creation of a snapshot of the file block, when the request is the first write request for the file block after creation of the snapshot of the file block: create, by the processor, a second logical block according to copy-on-write processing, determine, by the processor, a measure of access requests to be directed to a logical block allocated for the snapshot versus a logical block allocated for new data on the file block, wherein the logical block allocated for the snapshot and the logical block allocated for new data on the file block are uniquely chosen from: the first logical block and the second logical block, determine, by the processor, whether to send the measure of access requests to an automatic tiering module, and send, by the processor, the measure of access requests to the automatic tiering module when dictated by the determination.

In yet another general embodiment, a system includes a processor and logic integrated with and/or executable by the processor, the logic being configured to receive a request to write data to a file block on a multi-tier file system, wherein a first logical block is associated with the file block, determine whether the request is a first write request for the file block after creation of a snapshot of the file block, and when the request is the first write request for the file block after creation of the snapshot of the file block: create a second logical block according to copy-on-write processing, determine a measure of access requests to be directed to a logical block allocated for the snapshot versus a logical block allocated for new data on the file block, wherein the logical block allocated for the snapshot and the logical block allocated for new data on the file block are uniquely chosen from: the first logical block and the second logical block, determine whether to send the measure of access requests to an automatic tiering module, and send the measure of access requests to the automatic tiering module when dictated by the determination.

Figure 1B:
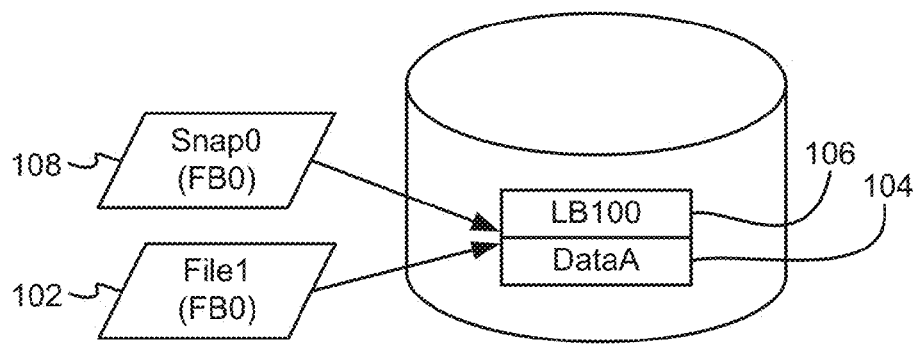
Figure 1C:
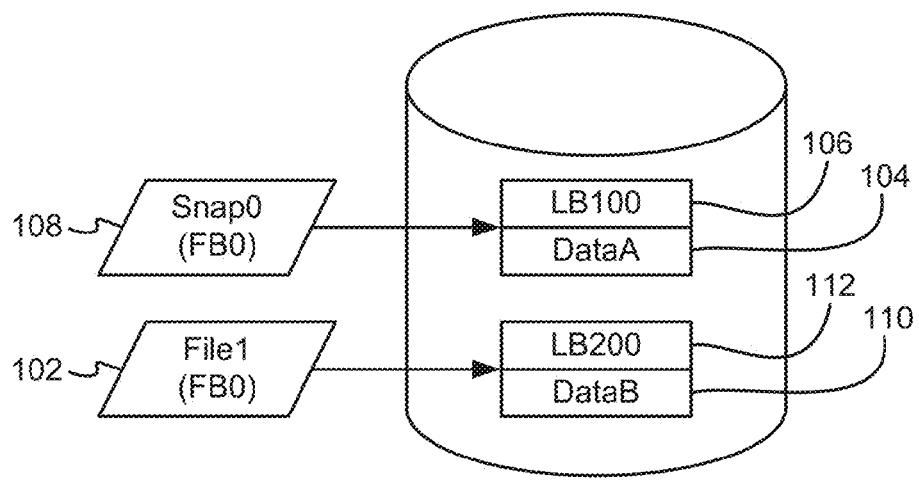

As an example of snapshot creation, as shown in FIG. 1A, a file block (FB0) from the original file (File1) 102 is assigned to a logical block (LB100) 106. This data is designated as DataA 104. Then, as shown in FIG. 1B, a snapshot (Snap0) 108 is created. The same logical block (LB100) 106 is used for the snapshot copy (Snap0) 108 and the latest file copy (File1) 102. A new logical block is not allocated for the snapshot (Snap0) 108 until a new write is performed on the file block (FB0) in the original file (File1) 102. As shown in FIG. 1C, when a new write is performed to the file block (FB0) in the original (File1) 102, a new logical block (LB200) 112 is allocated for the new data (DataB) 110. Old data (DataA) 104 remains in the logical block (LB100) 106 and new data (DataB) 110 is allocated in the new logical block (LB200) 112.

Multi-tiered storage is capable of using a storage method where data is stored on various types of storage devices primarily based on various criteria, such as the access requirements for the data, frequency of use of the data, security of the data, and data recovery requirements. For example, data that is frequently accessed by an application that is response-time sensitive might be stored on solid state drives (SSDs), flash memory, etc. Other data that is infrequently accessed and for which a longer response time is more tolerable might be stored on high capacity 7200 RPM hard disk drives (HDDs). The cost per gigabyte of storage is much higher for SSDs than it is for the HDDs or even magnetic tape. One challenge in effectively using multi-tiered storage is identifying the data that benefits from the higher cost/higher performance storage tiers. Over time, the optimal storage tier for a given piece of data may change. Thus, the identification and movement of data to an appropriate tier is an ongoing process.

Since SSDs are costlier than HDDs, solutions which allow for dynamic relocation of data across tiers based on the data usage by placing "hot" data with high I/O density and low response time requirements on SSDs while targeting HDDs or other slower-responding data storage devices for "cooler" data that is accessed more sequentially and/or at lower rates are preferred.

Figure 2:
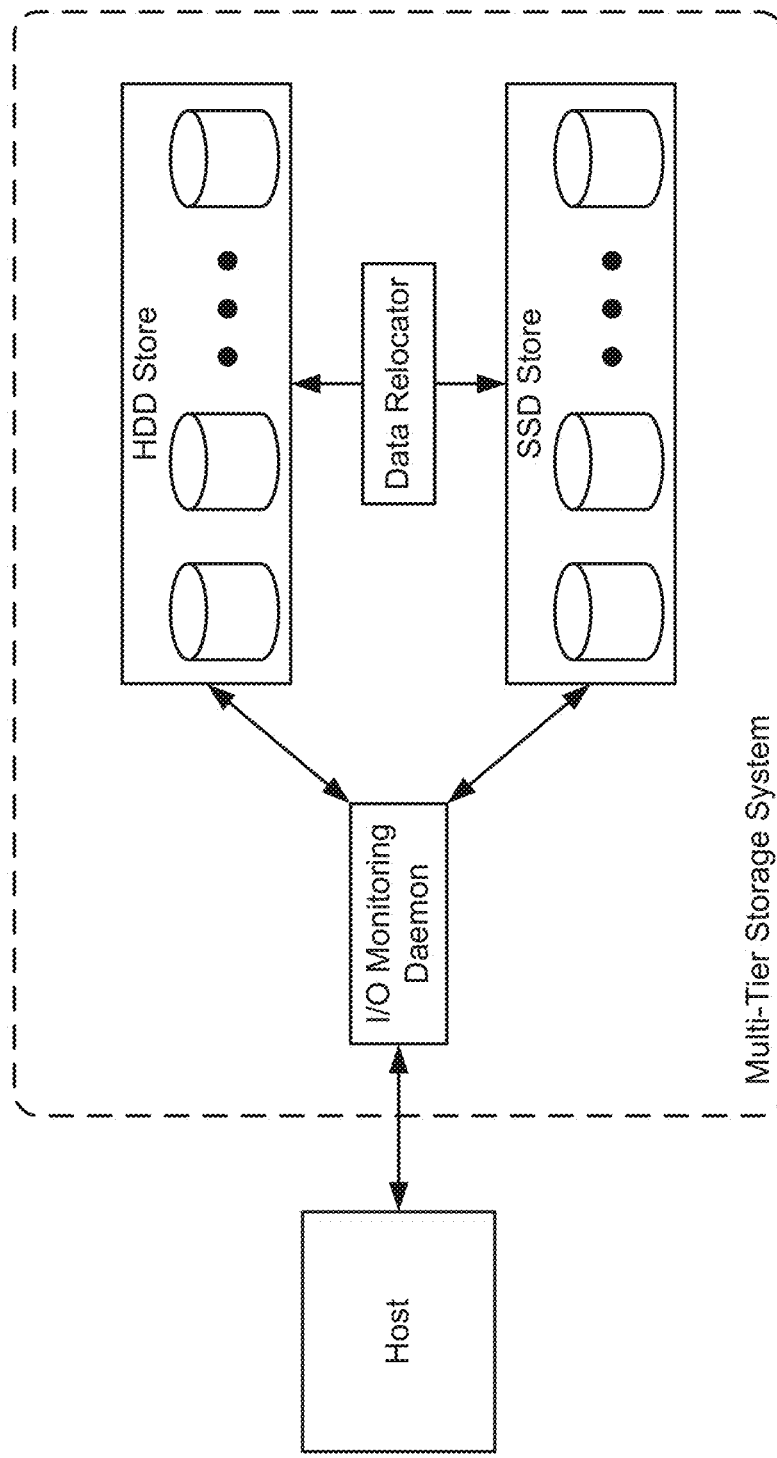
FIG. 2 shows a file system, in one example.

As shown in FIG. 2, an I/O monitoring daemon, which monitors for I/Os performed on HDDs, may be provided with a multi-tier storage system. This multi-tier storage system may be based an IBM Easy-Tier architecture or some other multi-tier system known in the art. Based on data access frequency, the I/O monitoring daemon identifies data that is heavily accessed ("hot"). A data relocator puts this hot data on a higher tier, which may have SSDs, for high throughput, low response times, and I/O operations per second (IOPS)-energy-efficient characteristics. As a result, the amount of expensive storage required to meet a given level of performance is minimized compared to other methods of data placement for tiered storage.

Figure 3B:
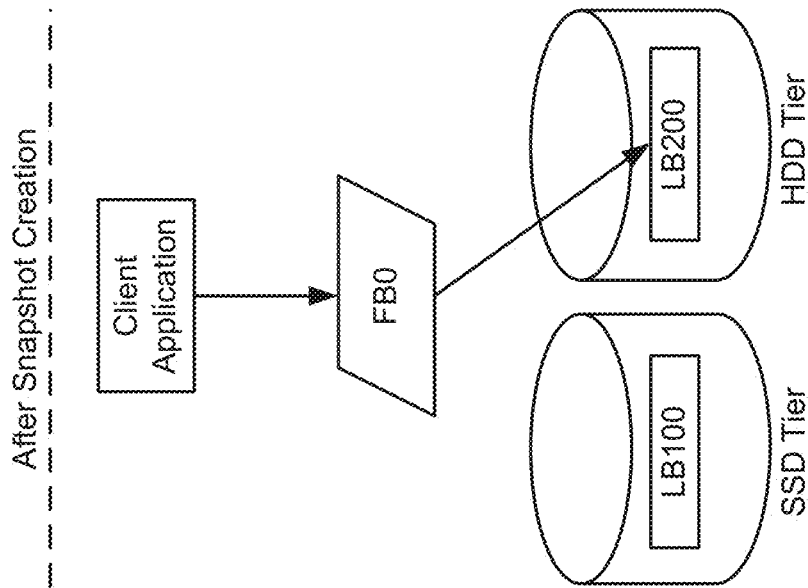
FIGS. 3A-3B illustrate a problem with snapshot creation in a file system in one example.
Figure 3A:
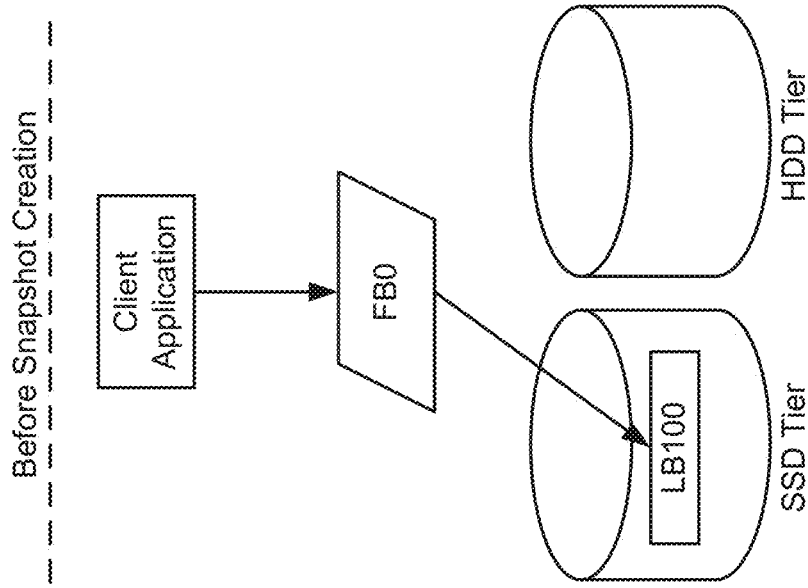

One of the problems with multi-tiered data storage is described with regard to FIGS. 3A-3B. A situation is shown in FIG. 3A where a client program is accessing a file block (FB0) prior to a snapshot being created. This file block (FB0) is pointing to logical block (LB100) before a snapshot is created and it is pointing to logical block (LB200) after the snapshot is created, as shown in FIG. 3B. Referring again to FIG. 3A, before the snapshot, because of multiple accesses by the user program on file block (FB0), the pointer is to logical block (LB100) on the SSD tier. For example, the number of accesses may be around 10,000, above a threshold used to determine which data is "hot." Multi-tier monitoring identifies logical block (LB100) as a hot block and places it in the SSD tier which provides performance benefits for the client program while accessing the file block (FB0).

Referring again to FIG. 3B, after the snapshot, file block (FB0) points to logical block (LB200). The client program is still accessing the same file block (FB0), but sufficient accesses have not yet been completed on logical block (LB200), for example around 100 accesses so far after the snapshot is created. Therefore, the file block (FB0) will point to the HDD tier instead of the SSD tier because the logical block (LB200) is not considered "hot" at this point after snapshot creation. Multi-tier will not detect this block as a hot block and the block will stay in the HDD Tier. The client program will, as a result of this transfer, suddenly start getting performance degradation as access of the file block (FB0) from the HDD tier is very slow in comparison to access from the SSD tier. This results in unexpected consequences in the client program behavior.

Besides these obvious performance issues, old logical block (LB100) might not be required by any application and may be evicted from the SSD tier, but currently, logical block (LB100) unnecessarily occupies SSD tier space that could be used for actually accessed logical block (LB200). This results in underutilization of SSD tier space, another problem with the current state of the art.

The above examples cover a case when the client program is taking a snapshot for backup purposes and always accesses the latest data. There will be other cases where the client program might be interested in using both the snapshot and latest copies.

Figure 4:
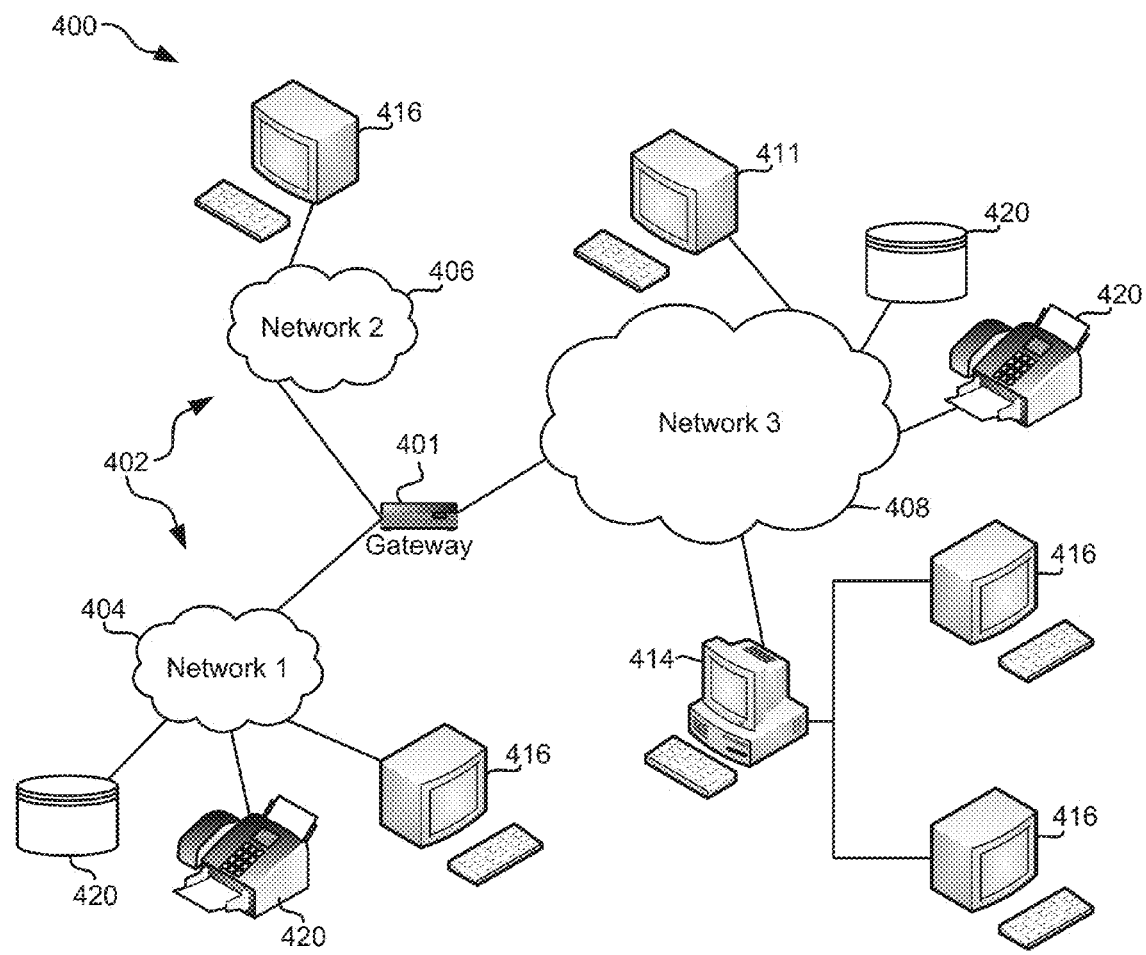
FIG. 4 illustrates a network architecture, in accordance with one embodiment.

FIG. 4 illustrates an architecture 400, in accordance with one embodiment. As shown in FIG. 4, a plurality of remote networks 402 are provided including a first remote network 404 and a second remote network 406. A gateway 401 may be coupled between the remote networks 402 and a proximate network 408. In the context of the present architecture 400, the networks 404, 406 may each take any form including, but not limited to a LAN, a WAN such as the Internet, public switched telephone network (PSTN), internal telephone network, etc.

In use, the gateway 401 serves as an entrance point from the remote networks 402 to the proximate network 408. As such, the gateway 401 may function as a router, which is capable of directing a given packet of data that arrives at the gateway 401, and a switch, which furnishes the actual path in and out of the gateway 401 for a given packet.

Further included is at least one data server 414 coupled to the proximate network 408, and which is accessible from the remote networks 402 via the gateway 401. It should be noted that the data server(s) 414 may include any type of computing device/groupware. Coupled to each data server 414 is a plurality of user devices 416. Such user devices 416 may include a desktop computer, lap-top computer, hand-held computer, printer or any other type of logic. It should be noted that a user device 411 may also be directly coupled to any of the networks, in one embodiment.

A peripheral 420 or series of peripherals 420, e.g., facsimile machines, printers, networked and/or local storage units or systems, etc., may be coupled to one or more of the networks 404, 406, 408. It should be noted that databases and/or additional components may be utilized with, or integrated into, any type of network element coupled to the networks 404, 406, 408. In the context of the present description, a network element may refer to any component of a network.

According to some approaches, methods and systems described herein may be implemented with and/or on virtual systems and/or systems which emulate one or more other systems, such as a UNIX system which emulates an IBM z/OS environment, a UNIX system which virtually hosts a MICROSOFT WINDOWS environment, a MICROSOFT WINDOWS system which emulates an IBM z/OS environment, etc. This virtualization and/or emulation may be enhanced through the use of VMWARE software, in some embodiments.

In more approaches, one or more networks 404, 406, 408, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used.

Figure 5:
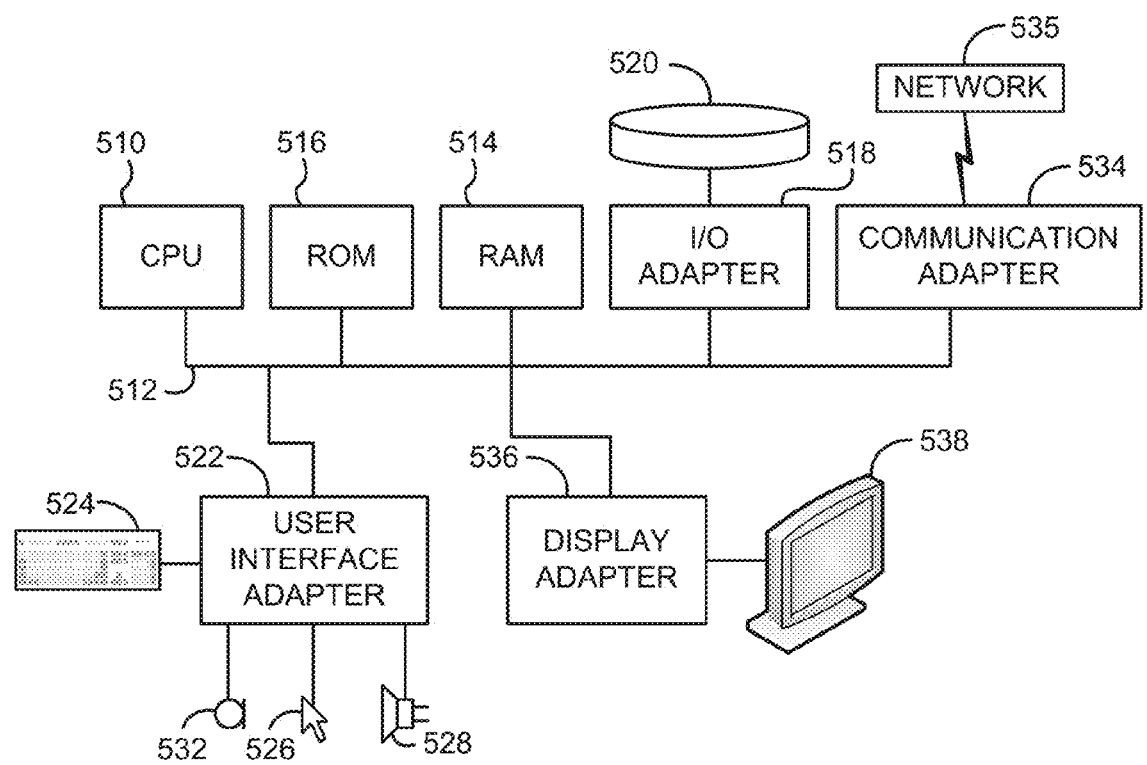
FIG. 5 shows a representative hardware environment that may be associated with the servers and/or clients of FIG. 4, in accordance with one embodiment.

FIG. 5 shows a representative hardware environment associated with a user device 416 and/or server 414 of FIG. 4, in accordance with one embodiment. Such figure illustrates a typical hardware configuration of a workstation having a central processing unit 510, such as a microprocessor, and a number of other units interconnected via a system bus 512.

The workstation shown in FIG. 5 includes a Random Access Memory (RAM) 514, Read Only Memory (ROM) 516, an I/O adapter 518 for connecting peripheral devices such as disk storage units 520 to the bus 512, a user interface adapter 522 for connecting a keyboard 524, a mouse 526, a speaker 528, a microphone 532, and/or other user interface devices such as a touch screen and a digital camera (not shown) to the bus 512, communication adapter 534 for connecting the workstation to a communication network 535 (e.g., a data processing network) and a display adapter 536 for connecting the bus 512 to a display device 538.

The workstation may have resident thereon an operating system such as the Microsoft Windows® Operating System (OS), a MAC OS, a UNIX OS, etc. It will be appreciated that a preferred embodiment may also be implemented on platforms and operating systems other than those mentioned. A preferred embodiment may be written using XML, C, and/or C++ language, or other programming languages, along with an object oriented programming methodology. Object oriented programming (OOP), which has become increasingly used to develop complex applications, may be used.

Figure 6:
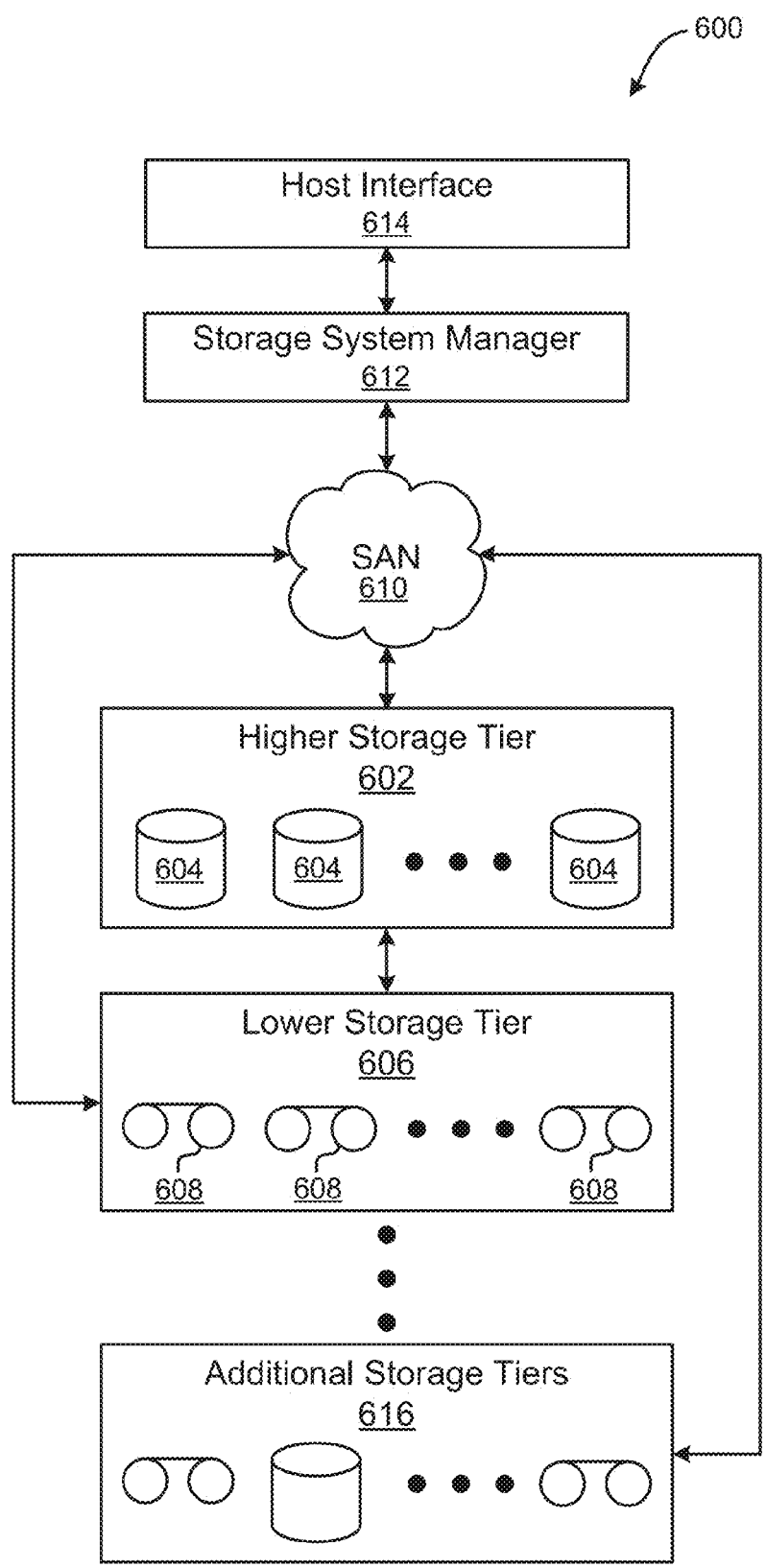
FIG. 6 illustrates a tiered data storage system in accordance with one embodiment.

Now referring to FIG. 6, a storage system 600 is shown according to one embodiment. Note that some of the elements shown in FIG. 6 may be implemented as hardware and/or software, according to various embodiments. The storage system 600 may include a storage system manager 612 for communicating with a plurality of media on a higher storage tier 602 and a lower storage tier 606. The higher storage tier 602 preferably may include one or more random access and/or direct access media 604, such as hard disks in hard disk drives (HDDs), nonvolatile memory (NVM), solid state memory in solid state drives (SSDs), etc., and/or others noted herein. The lower storage tier 606 may preferably include one or more sequential access media 608, such as magnetic tape in tape drives, optical media, etc., and/or others noted herein. Additional storage tiers 616 may include any combination of storage memory media. The storage system manager 612 may communicate with the storage media 604, 608 on the higher and lower storage tiers 602, 606 through a network 610, such as a storage area network (SAN), as shown in FIG. 6. The storage system manager 612 may also communicate with one or more host systems (not shown) through a host interface 614, which may or may not be a part of the storage system manager 612. The storage system manager 612 and/or any other component of the storage system 600 may be implemented in hardware and/or software, and may make use of a processor (not shown) for executing commands of a type known in the art, such as a central processing unit (CPU), a field programmable gate array (FPGA), an application specific integrated circuit (ASIC), etc. Of course, any arrangement of a storage system may be used, as will be apparent to those of skill in the art upon reading the present description.

In more embodiments, the storage system 600 may include any number of data storage tiers, and may include the same or different storage memory media within each storage tier. For example, each data storage tier may include the same type of storage memory media, such as HDDs, SSDs, sequential access media (tape in tape drives, optical disk in optical disk drives, etc.), direct access media (CD-ROM, DVD-ROM, etc.), or any combination of media storage types. In one such configuration, a higher storage tier 602, may include a majority of SSD storage media for storing data in a higher performing storage environment, and remaining storage tiers, including lower storage tier 606 and additional storage tiers 616 may include any combination of SSDs, HDDs, tape drives, etc., for storing data in a lower performing storage environment. In this way, more frequently accessed data, data having a higher priority, data needing to be accessed more quickly, etc., may be stored to the higher storage tier 602, while data not having one of these attributes may be stored to the additional storage tiers 616, including lower storage tier 606. Of course, one of skill in the art, upon reading the present descriptions, may devise many other combinations of storage media types to implement into different storage schemes, according to the embodiments presented herein.

According to some embodiments, the storage system (such as 600) may include logic adapted to receive a request to open a data set, logic adapted to determine if the requested data set is stored to a lower storage tier 606 of a tiered data storage system 600 in multiple associated portions, logic adapted to move each associated portion of the requested data set to a higher storage tier 602 of the tiered data storage system 600, and logic adapted to assemble the requested data set on the higher storage tier 602 of the tiered data storage system 600 from the associated portions.

Of course, this logic may be implemented as a method on any device and/or system or as a computer program product, according to various embodiments.

According to one embodiment, efficient management of high performance tiers in a multi-tier file system is possible such that during a first write after snapshot creation, when a new logical block is assigned to a given application block, heatmap information may be transferred from an existing logical block to the new logical block. Based on application behavior, whether data is going to be accessed from a snapshot copy or a latest data copy, a decision as to how much of the heatmap information is transferred may be made. The amount of heatmap information to transfer may be complete, partial, or none at all. Complete heatmap transfer may be performed when the snapshot is created just for backup purposes, when data in the snapshot copy is not going to be accessed frequently and a client program is accessing data only from the latest data copy.

The heatmap information may be transferred partially when both the snapshot copy and the latest data copy are both being accessed (either equally or in some determined ratio). For the given tuple of <OldBlock in snapshot, NewBlock in latest data copy>, the file system may inform the multi-tier file system of the heatmap transfer percentages, such as during a block flush operation. A multi-tier monitoring daemon will update its monitoring statistics for the OldBlock and NewBlock based on the percentages of heatmap transfer and make a decision for placement of the block chunks on one of the tiers (such as a SSD tier, HDD tier, etc.).

During the creation of a snapshot, based on the desired usage of the snapshot, an administrator or some other designated individual, or an automated process, is expected to estimate distribution of application accesses between the snapshot data and the latest data copy. This value will be passed as an input to the snapshot creation routine or command as explained in detail later. It will be stored in the multi-tier file system, such as in a snapshot metadata information table. This value will be referred to during a first write after snapshot creation when a new logical block is allocated.

Figure 7:
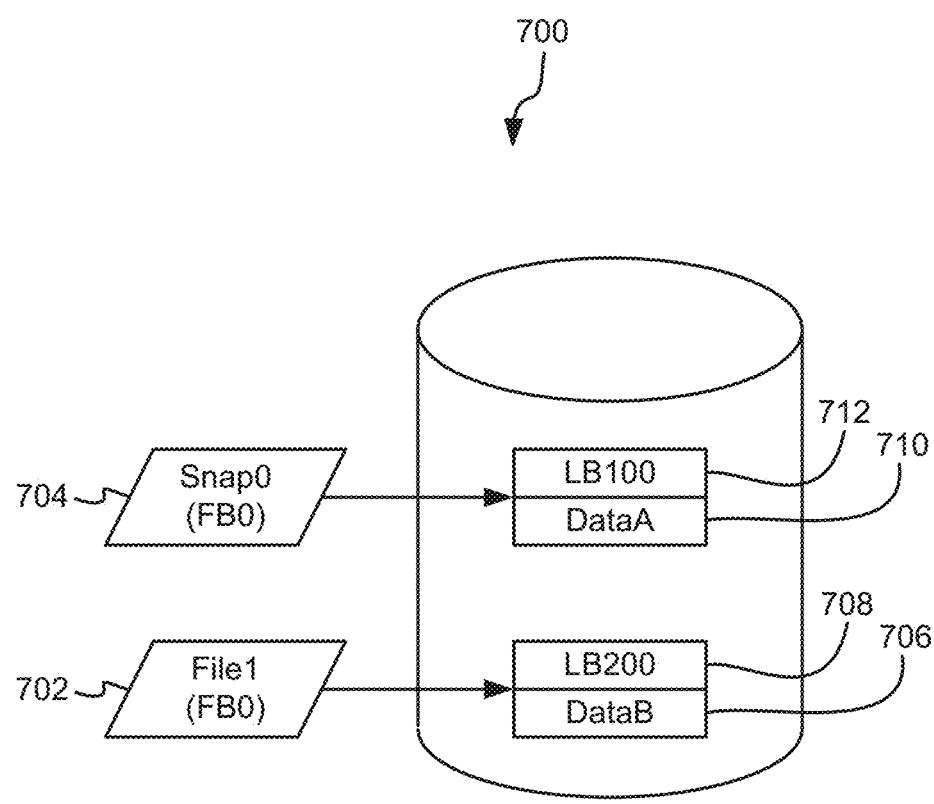
FIG. 7 shows a portion of a file system, according to one embodiment.

Referring now to FIG. 7, a portion of a file system 700 is shown, according to one embodiment, after creation of a snapshot of a file block. The file block (FB0) is accessible through the latest, up-to-date file, File1 702, and through a snapshot of File1 702 created at some point in time, referred to as Snap0 704. When data is written to FB0, the new data is written as DataB 706 in the allocation of a new logical block (LB200) 708, while the old data, DataA 710, remains in logical block (LB100) 712. The new DataB 706 in the logical block LB200 708 is pointed to by FB0 in the latest File1 702, while the old data, DataA 710 in logical block LB100 712 is pointed to by the snapshot copy Snap0 704.

In order to provide exemplary situations where problems may arise in the management of this data in a multi-tier file system, Table 1 is provided below which provides some possible scenarios that could affect how data is accessed, stored, etc., on the file system 700. In Table 1, the values listed for LB100 and LB200 are exemplary heatmap values to be associated with each logical block assuming a total of 10,000 access requests. Furthermore, it is assumed that upon a first write after the snapshot copy, Snap0 704, is created, the heatmap indicated 10,000 access requests for DataA 710 on LB100 712, and no access requests for DataB 706 on LB200 708.

TABLE 1

| Situation (Access Characteristics) | LB100 | LB200 |
| --- | --- | --- |
| 1) Only File1 | 0 | 10,000 |
| 2) Both File1 and Snap0 equally | 5,000 | 5,000 |
| 3) Both File1 and Snap0 unevenly (e.g., 60% File1, 40% Snap0) | 4,000 | 6,000 |
| 4) Only Snap0 | 10,000 | 0 |

As shown in Table 1, in situation 1: the application is only accessing the latest copy, File1 702, which points to DataB 706 on LB200 708. Accordingly, the heatmap is completely transferred from the snapshot copy, Snap0 704, to the latest copy, File1 702, such that all accesses will be made to File1 702, which points to DataB 706 on LB200 708. This is necessary because the heatmap prior to creation of the snapshot copy, Snap0 704, represented all access being on Snap0 704, but in practice, all the accesses are to File1 702. Therefore, the heatmap is transferred from Snap0 704 to File1 702.

In situation 2: when an application is accessing data from both the latest copy File1 702 which points to DataB 706 on LB200 708, and the snapshot copy, Snap0 704 which points to DataA 710 on LB100 712, equally, then the heatmap is divided evenly across both blocks, Snap0 704 and File1 702, thereby ensuring that accesses are evenly distributed across both blocks. If the evenly distributed heatmap causes one block to be "hot," then both blocks will be "hot" and stored on the faster storage tier.

In situation 3: when an application is accessing data from both the latest copy File1 702 which points to DataB 706 on LB200 708, and the snapshot copy, Snap0 704 which points to DataA 710 on LB100 712, unevenly, then the heatmap is divided according to a measure of access requests across both blocks, Snap0 704 and File1 702, thereby ensuring that accesses are distributed across both blocks according to their actual, in practice values. The measure of access requests may take any of many forms, for example, the measure may be a percentage of total access requests, a proportion of total accesses, a ratio of accesses for one logical block versus the other logical block, etc. In the example, the heatmap values would be split up 40% to Snap0 704 and 60% to File1 702, the total heatmap value (which tracks the total access count) being split according to the calculated percentages to each of Snap0 704 and File1 702. If either of the proportionally-distributed portions of the heatmap causes a block to be "hot," then that block will point to a logical block on the faster storage tier.

In situation 4: the application is only accessing the snapshot copy, Snap0 704, which points to DataA 710 on LB100 712. Accordingly, there is no need to transfer the heatmap or make any changes to the heatmap, because the access profile is consistent with what the heatmap represented prior to creation of the snapshot copy, Snap0 704.

Based on a multi-tier heat or access request threshold value, a multi-tier relocation module may decide placement of these blocks (LB100 712 and/or LB200 708) on the faster storage tier (e.g., the SSD tier as opposed to HDD or magnetic tape, optical disk, etc.). This way, for a client program, there is no change in I/O latency and performance after creation of the snapshot.

For communication of the heatmap between the file system and a multi-tier appliance or any other device to which the heatmap or any other data may be sent or exchanged, any method known in the art may be used. In one embodiment, a separate out-of-band protocol may be used to transfer heatmap information. In another embodiment, reserved fields in the write command descriptor block (CDB), in which small computer system interface (SCSI) commands are sent, may be used to transfer the allocation of heatmap data across the snapshot and original copy of the data.

This helps to ensure that in a remote copy scenario, where when a fail over takes place, the heatmap information is properly represented to avoid disruption of performance for users accessing data on the file system. This mechanism may be used for communication of measure(s) of the heatmap value from an application to a multi-tier appliance.

Copy-on-write operations are performed at the granularity of the file system block size. However, a multi-tier system monitors heatmap information at the extent level. Each extent may include multiple file system block sizes. When an enterprise application accesses a file on the file system, the application modifies the files as per the enterprise application's requirements, which involves modifying a plurality of file system blocks at the same time, e.g. an application like a database application will always modify data at the granularity of the user record. If the block size is 16 MB and a user record is 128 MB, a single user record modification by the database application results in modifying 8 blocks at the file system level.

There are existing mechanisms which ensure contiguous allocations for new blocks during copy-on-write. A heatmap transfer mechanism is very efficient when application access size is comparable with multi-tier extent size, but does not take into account the difference in sizes.

In order to account for actual access request frequency on a snapshot and/or original file after creation of the snapshot, several mechanisms may be employed which will allow for the heatmap information to be properly assigned to associated logical blocks after creation of the snapshot logical block.

In one example, a measure of snapshot usage, referred to in this example as snapshot percentage information (percentage of access requests directed to the snapshot versus access requests directed to the original file) may be maintained on the multi-tier file system. In one embodiment, a first storage construct, such as a database, table, list, etc., that may be accessible to the automatic tiering module, may be maintained for each snapshot (or a single storage construct may be maintained for all snapshots), along with a measure of snapshot usage activity, e.g., snapshot percentage information.

In one exemplary embodiment, Table 2 below may represent a Snapshot Information Table.

TABLE 1

Exemplary Snapshot Information Table

| Snapshot Name | Snap Creation Time | Snapshot Percentage |
|---|---|---|
| Snap1 | August 12, 2013 00:00:00 | 50 |
| Snap2 | August 13, 2013 06:30:00 | 100 |
| Snap3 | August 14, 2013 06:30:00 | 60 |

The first storage construct is maintained by the multi-tier file system as snapshot metadata. It includes an entry for each active file snapshot and information about each snapshot's creation time, and access request measure (e.g., percentage), among other possible fields. New information and categories (columns in the exemplary table) may be added to this first storage construct to store other information that may be useful in managing the snapshots and original data in the multi-tier file system. For example, the access request percentage may be used to determine how many blocks of data will be accessed from an old file copy verses a latest file copy data (snapshot versus original file).

In order to decide a percentage or proportion of distribution of access requests after the snapshot is created, a request to create the snapshot may include information not normally included in a snapshot creation request. For example, the snapshot creation request may include an access parameter which may indicate a measure of access requests that will be directed to the snapshot after creation thereof. This access parameter may be a number, a percentage, a count, or any other suitable parameter capable of being understood by the file system and/or automatic tiering module.

For example, a command line interface may be used to request snapshot creation. In this example, a command may be entered, such as by a user or application which is requesting the creation of the snapshot. In one approach, the command may be similar to:
>createSnapshotFS However, in other approaches, a name may be assigned to the snapshot at the time of creation by using a command similar to: >createSnapshotFS—snapName SnapshotName. An administrator or other authorized user may manually, or through one or more automated scripts, invoke this or a similar command to create the snapshot with the provided name.

In another approach, a snapshot may be created for one of a variety of purposes, such as backup, check-pointing, cloning and/or replication, etc., among others known in the art. A point in time image of the file system is created and made read-only (at least partially) so that it may be restored at a later time with the file system at this particular point in time. Here, a client or user program accesses data from a latest copy (which may be updated from time to time) and not from the snapshot copy. A command may be used similar to:
>createSnapshotFS—snapName "checkpointSnap1"

This would be a snapshot created for check-pointing purposes.

For cloning and/or replication purposes, a point in time image of the file system may be created and data from that image is copied to another location for replication purposes. Here, a client or user program accesses data from the snapshot copy and not from the latest copy (which may be updated from time to time). A command may be used similar to:

>createSnapshotFS—snapName "replicationSnap1"

This would be a snapshot created for replication purposes.

At the time of snapshot creation, an administrator or other authorized user knows the purpose of creating the snapshot whether it's for check-point, replication, or some other usage. Thus, it is possible for the administrator or other authorized user to determine whether the client or user program is going to access data from the snapshot copy or the latest copy.

The snapshot creation command, such as "createSnapshotFS," may be modified to include any desired information upon creation of the snapshot, in order to illicit desired information from the snapshot creator, whether it is a user, administrator, application, or some other entity that is creating the snapshot and/or requesting creation of the snapshot.

For example, in one embodiment, a new argument or parameter may be included/required in the snapshot creation command line interface, such as a snapAccessPattern to specify an access parameter. In one approach, the access parameter may be represented in terms of a percentage, such as a "SnapAccess %," which indicates an amount of total accesses that are directed to the snapshot copy versus an amount of total accesses directed to the latest copy (100% being the total access requests). In other embodiments, the access parameter may be represented in terms of a count, a ratio, a proportion, etc.

For example, when a snapshot is created for check-pointing purposes, the command line interface may look like:

>createSnapshotFS—snapName "checkpointSnap1"—snapAccessPattern "0"

This snapshot creation indicates that there will be no data access from the snapshot copy, e.g., all data accesses will be directed to the latest copy. When a snapshot is created for replication, such as via the following command line interface, data access is indicated as only being directed to the snapshot copy, and not from the latest copy.

>createSnapshotFS—snapName "replicationSnap1"—snapAccessPattern "100"

Besides the above examples, when a client or user program is going to access data from both copies, an administrator or other authorized user may be able to determine usage patterns for the various copies and assign a SnapAccess value thereto. This determination may be based on past access behavior, e.g., when an administrator determines that 40% of overall accesses are directed to the snapshot copy and the remaining 60% of overall accesses are directed to the latest data, then the following exemplary command line interface may b used:

>createSnapshotFS—snapName mixedUsageSnap1—snapAccessPattern "40"

This snapshot creation command indicates that 40% of the data accesses will be from the snapshot copy and the remaining accesses will be from the latest data copy. The file system may internally receive this SnapAccess % value, update an access parameter for the snapshot copy, which may be referred to as an "Old Snapshot Value" entry for a given snapshot, and may use this access parameter during copy-on-write in order to perform a heatmap transfer between the original logical block and a new logical block.

In order to perform this heatmap transfer, the measure of access requests are sent, exchanged, or passed to the multi-tier file system. This may be accomplished by the following routine, which may be altered or modified as seen fit by one of skill in the art upon reading the present descriptions. The client or user program may perform a write on a file block (e.g., FB0), and when this is a first write on the file block (FB0) after the creation of a snapshot, normal copy-on-write processing is performed (a new logical block is created and associated with either the snapshot copy or the latest copy of the file block, FB0). Then, the percentages or proportions of total accesses are obtained, calculated, determined, or otherwise obtained for at least one of the snapshot copy and the latest copy, either after snapshot creation, or in the case of the original file, before snapshot creation, in order to determine a measure of access requests to be directed to a logical block allocated for the snapshot versus a logical block allocated for new data on FB0.

In one embodiment, a storage construct, such as a table, database, list, etc., may be examined in order to obtain a percentage of access requests. When the percentage of access requests for the logical block to which the snapshot is correlated is not 100% (e.g., all access requests are to be directed to the logical block to which the snapshot points), the percentage of access requests may be communicated to the multi-tier file system. In one embodiment, a message or communication channel may be used to communicate the percentage of access requests to the file system, such as via an out-of-protocol message in order to alleviate traffic on the communication band. In other embodiments, other measures of the accesses or access requests may be used, such as access counts, access request counts, proportion of accesses to the particular element versus total accesses, etc.

In one embodiment, a tuple may be communicated to the file system that indicates the distribution of access requests across the logical blocks. The tuple may include identification of the logical block used for the data prior to creation of the snapshot copy, the new logical block created when the snapshot is created and a measure of access requests for the logical block used for the data prior to creation of the snapshot copy. One of these logical blocks will be utilized for the snapshot copy after creation thereof, and the other logical block will be utilized for the latest copy of the data. In one approach, the tuple may have the form of: <LB-old, LB-new, Old Measure Value>. In one embodiment, the Old Measure Value may be a percentage value, such that the tuple is <LB-old, LB-new, Old Percentage Value>. For the remainder of this example, it is assumed that the Old Measure Value is Old Percentage Value.

Also, in some embodiments, to avoid communication overheads, multiple requests may be merged together into a single communication.

According to one embodiment, the distribution of access requests may be monitored on the file system block level. Of course, in other embodiments, the granularity of file usage may be greater or less than the block level, such as extent level.

In order to handle the measure of access requests at the multi-tier file system, the measure of access requests may be received, such as in the tuple described previously. Then, a heatmap may be established for the old logical block that was associated with the data prior to creation of the snapshot copy. In one approach, the heatmap information may be obtained from a monitoring table, database, or some other storage construct. The heatmap information may be based on the access request count that has been tracked for the logical block associated with the data prior to creation of the snapshot copy.

When the Old Percentage Value is 0, in the multi-tier monitoring table, assign the current heatmap count as the heatmap count for the new logical block (LB-new) and reset the heatmap count for the old logical block (LB-old). Then, the old logical block may be evicted from a higher tier of the file system (such as a SSD tier or some other higher availability storage device tier).

When the Old Percentage Value is not 0 (but also not 100), the heatmap count for the old logical block may be calculated as HeatMapCountOld=HeatMapCountCurrent*OldPercentage-Value/100. Also, the heatmap count for the new logical block created after snapshot creation as HeatMapCountNew=HeatMapCountCurrent−HeatMapCountOld. In the multi-tier monitoring table, the HeatMapCountOld may be assigned for the old logical block (LB-old) and the HeatMapCountNew may be assigned for the new logical block (LB-new).

Figure 8:
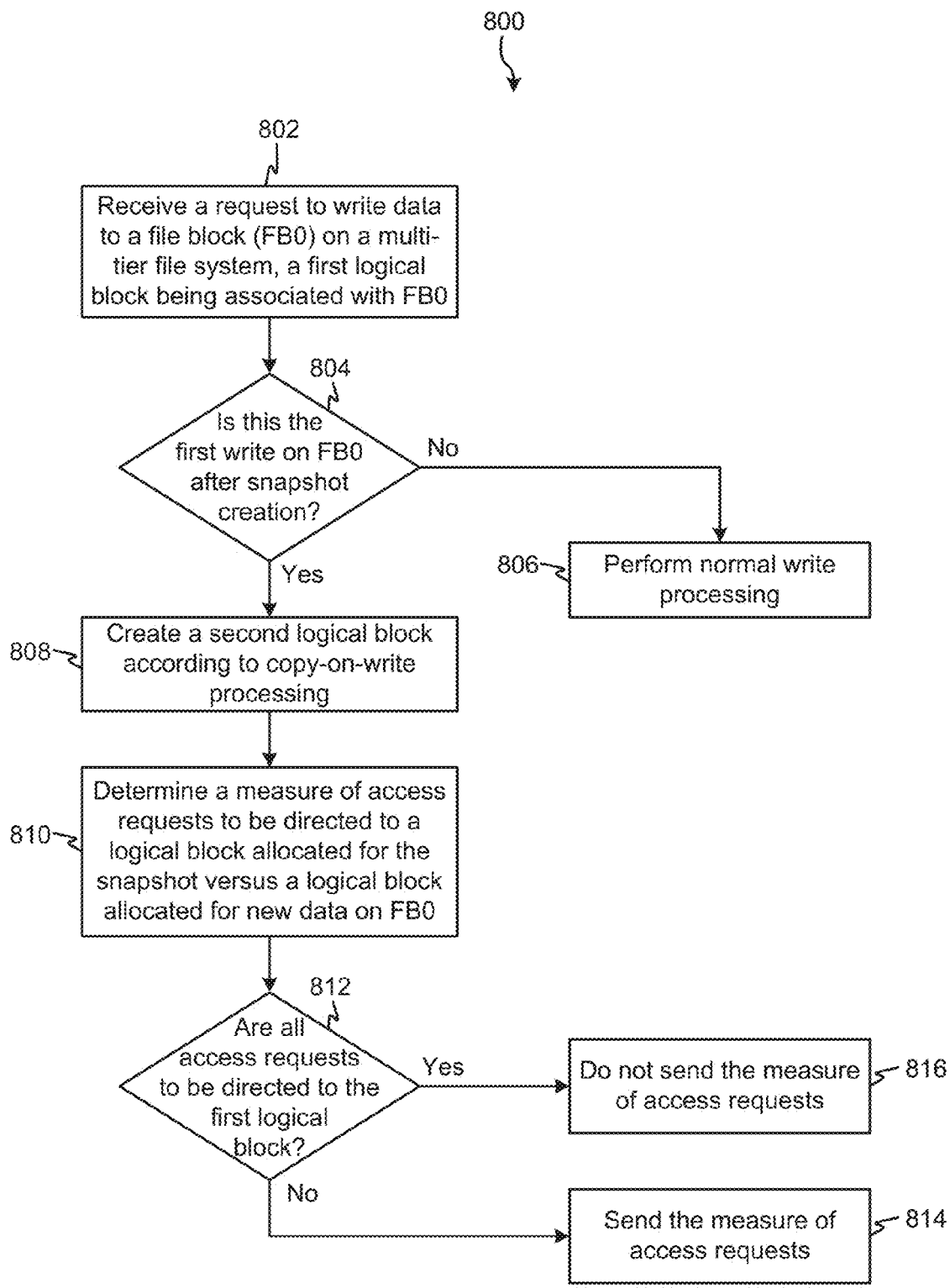
FIG. 8 is a flowchart of a method for managing data according to one embodiment.

Now referring to FIG. 8, a flowchart of a method 800 for managing data is shown according to one embodiment. Method 800 may be executed in any desired environment, including those shown in FIGS. 1-7, among others. Furthermore, more or less operations than those specifically described in FIG. 8 may be included in method 800.

In operation 802, a request is received to write data to a file block on a multi-tier file system. A first logical block is associated with the file block, whether stored in the same storage media or on different storage media, possibly located remotely from one another.

The request may originate from any entity which desires for data to be written to the file block, such as a user, an application, a system, etc.

In operation 804, it is determined whether this is a first write request for the file block after creation of a snapshot of the file block. In other words, if a snapshot copy of the data in the first logical block (for the file block) has been created, and no other write requests have been received to write data to the file block, then this qualifies as a first write request for the file block after creation of the snapshot.

In operation 806, when the request is not the first write request for the file block after creation of the snapshot of the file block, normal write processing is performed, as would be understood by one of skill in the art. In addition, any changes that may be made after the first write should already have been made after the first write, so normal write processing may already be affected by operations 808-816.

In operation 808, when the request is the first write request for the file block after creation of the snapshot of the file block as determined in operation 804, a second logical block is created according to copy-on-write processing. Any method of creating the second logical block may be used, as known in the art.

In one embodiment, the snapshot copy will correspond with the second logical block, while the original file block will correspond with the first logical block. In an alternate embodiment, the snapshot copy will correspond with the first logical block, while the original file block will correspond with the second logical block. Any copying, moving of data, or other data management operations that are necessary to cause either of these scenarios to occur may be performed in order to properly relate the logical blocks to the file and snapshot.

In operation 810, a measure of access requests to be directed to a logical block allocated for the snapshot versus a logical block allocated for new data on the file block is determined. The logical block allocated for the snapshot and the logical block allocated for new data on the file block are uniquely chosen from: the first logical block and the second logical block; however, which logical block is used for the new data and the snapshot data may be chosen based on any factor known in the art, such as efficiency, ease of operation, storage locations, etc.

In one embodiment, the determining the measure of access requests to be directed to the logical block allocated for the snapshot versus the logical block allocated for new data on the file block may comprise receiving the measure of access requests from: a user who initiated creation of the snapshot or an application which initiated creation of the snapshot. Of course, in other embodiments, the measure of access requests may be calculated or otherwise determined based on any number of factors known in the art.

In operation 812, it is determined whether to send the measure of access requests to an automatic tiering module. The automatic tiering module may be logic, computer program code, an application, a system, or some other device capable of determining which tier of the multi-tier file system to store data that is received by the file system. This decision may be based on any number of factors known in the art, such as the accessibility of the tier and/or data, the priority of the data, the type of storage in each tier, etc.

In operation 814, the measure of access requests is sent to the automatic tiering module when dictated by the determination. Otherwise, in operation 816, the measure of access requests is not sent to the automatic tiering module because the distribution of access requests is already accounted for in the heatmaps for the logical blocks.

In a further embodiment, method 800 may include creating the snapshot of the file block in response to receiving a request to create the snapshot. The request to create the snapshot may comprise an access parameter. This access parameter may be any value, identification, factor, criterion, etc., and in one embodiment, this access parameter may be a measure of accesses or access requests, such as an access request count or percentage of total access requests for the file block and/or first logical block. The measure of access requests to be directed to the logical block allocated for the snapshot versus the logical block allocated for new data on the file block may be determined based at least partially on the access parameter in one approach.

Figure 9:
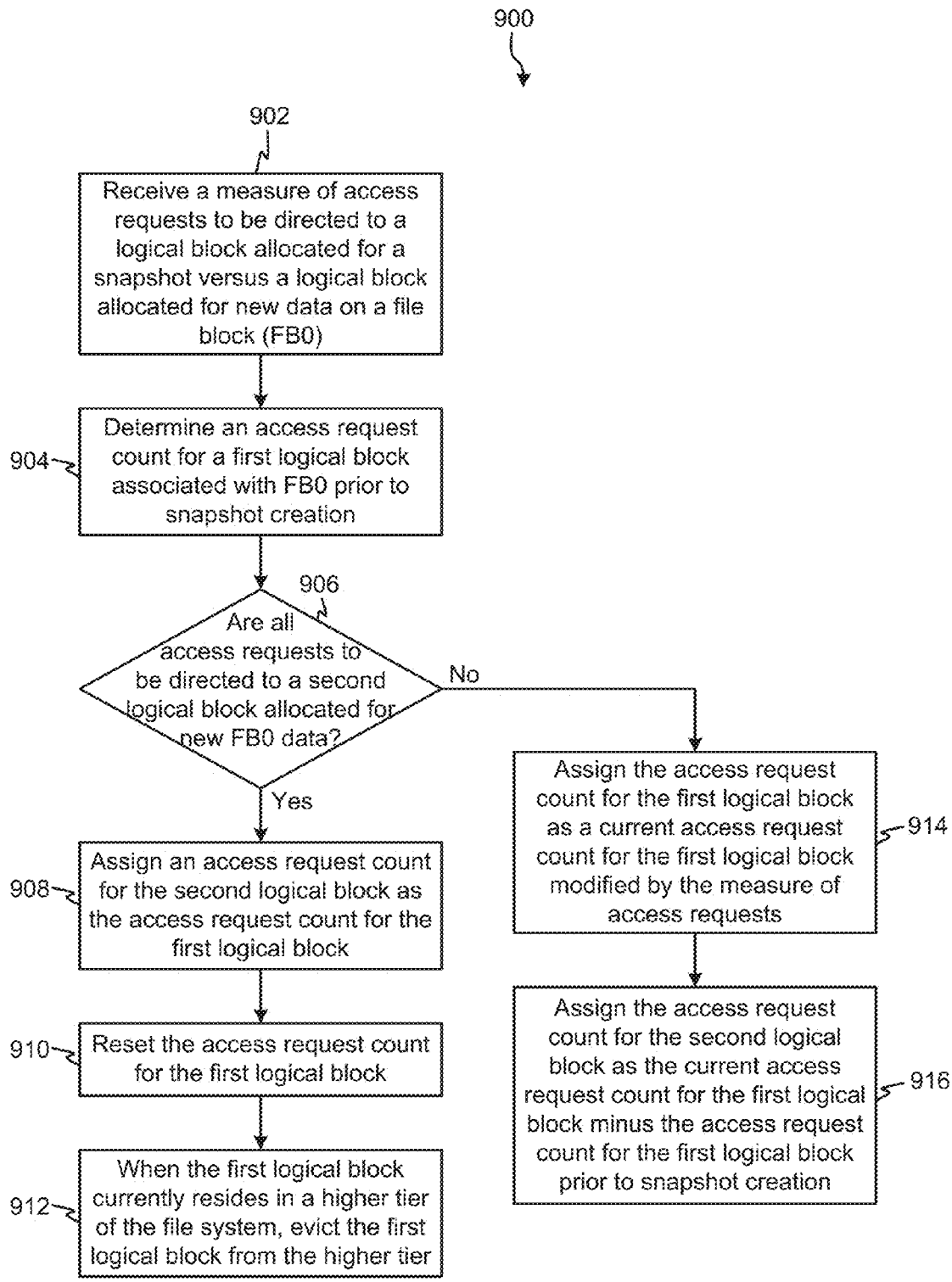
FIG. 9 is a flowchart of a method for managing data according to one embodiment.

In a further embodiment, method 800 may include some or all operations as described in method 900 shown in FIG. 9 according to one embodiment.

Now referring to FIG. 9, a flowchart of a method 900 for managing data is shown according to one embodiment. Method 900 may be executed in any desired environment, including those shown in FIGS. 1-7, among others. Furthermore, more or less operations than those specifically described in FIG. 9 may be included in method 900.

In operation 902, the measure of access requests to be directed to the logical block allocated for the snapshot versus the logical block allocated for new data on the file block (e.g., FB0) is received.

In operation 904, an access request count for the first logical block associated with FB0 prior to creation of the snapshot is determined. This access request count is a value which may be monitored on a file basis, extent basis, file block basis, or on any other granularity possible using the multi-tier file system, accounting for the efficiency of the process and frequency of the monitoring updates.

In a further embodiment, the access request count for the first logical block prior to creation of the snapshot may be determined by retrieving the access request count for the first logical block from a first storage construct accessible to the automatic tiering module. The storage construct may be a table, database, list, etc., and may be updated according to a predetermined schedule and/or in response to any conceivable action on the file system, as would be understood by one of skill in the art.

In operation 906, it is determined whether all access requests are to be directed to the second logical block allocated for new data on the file block. As stated earlier, either of the first or second logical blocks may be associated/allocated for either of the new data or the snapshot data (which is to remain unchanged). It is not important which is associated/allocated, only that the access request count for the original logical block be associated with whichever file block or snapshot is associated therewith after snapshot creation.

In operation 908, when all access requests are to be directed to the second logical block allocated for new data on the file block, an access request count for the second logical block is assigned as the access request count for the first logical block, and method 900 continues to operations 910 and 912.

In operation 910, the access request count for the first logical block is rest, as would be understood by one of skill in the art.

In operation 912, when the first logical block currently resides in a higher tier of the multi-tier file system and when all access requests are to be directed to the second logical block allocated for new data on the file block, the first logical block is evicted from the higher tier and reassigned to a lower tier. This operation is not required, and is useful in alleviating demand for the higher tier(s) of the file system, effectively freeing up space that is not being accessed frequently enough to justify maintaining the data stored there on the higher tier(s).

In operation 914, when not all access requests are to be directed to the second logical block allocated for new data on the file block, the access request count for the first logical block is assigned as a current access request count for the first logical block modified by the measure of access requests and method 900 continues to operation 916. For example, when the measure is a percentage, the access request count for the first logical block is calculated as the current access request count for the first logical block multiplied by the percentage of access requests.

In operation 916, the access request count for the second logical block is assigned as the current access request count for the first logical block minus the access request count for the first logical block prior to creation of the snapshot.

In another embodiment, the first logical block and the second logical block may each be assigned to an appropriate tier of the multi-tier file system according to the access request count for the first logical block and the access request count for the second logical block in an attempt to better manage data across the multiple tiers, and to ensure that only hot data is stored on the higher tier(s) of the file system, and cold data is stored to lower tier(s) of the file system.

The methods 800 and 900 may be executed individually or in combination in a system, device, apparatus, and/or computer program product utilizing a computer readable storage medium.

The system may include logic (hard and/or soft) that is implemented in a processor, of any type known in the art. The logic may be encompassed by the processor, accessible to the processor, and/or stored to memory that the processor accesses to perform the functionality dictated by the logic, according to various embodiments.

Figure 10:
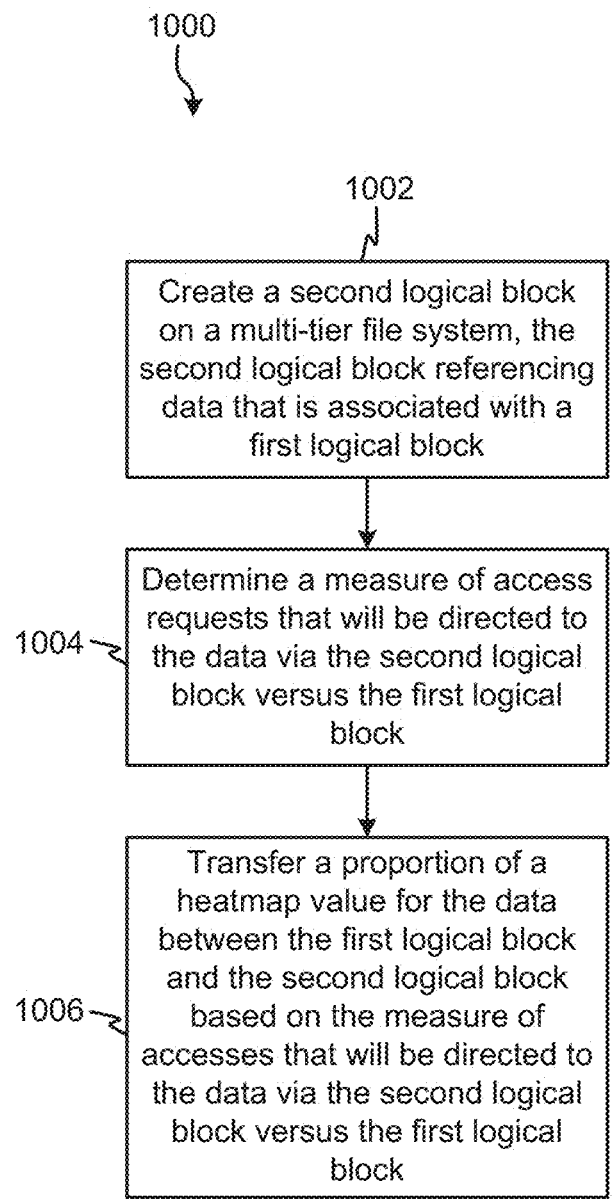
FIG. 10 is a flowchart of a method for managing data according to one embodiment.

Referring now to FIG. 10, a method 1000 for managing data is shown according to another embodiment. Method 1000 may be executed in any desired environment, including those shown in FIGS. 1-7, among others. Furthermore, more or less operations than those specifically described in FIG. 10 may be included in method 1000.

In operation 1002, a second logical block is created on a multi-tier file system, the second logical block referencing data that is associated with a first logical block. In one embodiment, the second logical block may represent a snapshot copy of the data, and the second logical block may be created in response to receiving a request to modify the data after creation of the snapshot copy of the data.

In operation 1004, a measure (such as a percentage, a count, a proportion, etc.) of access requests that will be directed to the data via the second logical block versus the first logical block is determined, using any technique known in the art. In one embodiment, the measure may be a percentage which is included in the request to modify the data or to create the snapshot.

In operation 1006, a proportion of a heatmap value (such as a total access count) for the data is transferred between the first logical block and the second logical block based on the measure of accesses that will be directed to the data via the second logical block versus the first logical block. In this way, when a heatmap is already established for the data, the information from this heatmap may be transferred as appropriate to the various logical blocks in a proportion related to the actual usage of each of the logical blocks.

In one embodiment, the second logical block may be created according to copy-on-write processing, and the method 1000 may further include sending the measure of access requests to an automatic tiering module, the automatic tiering module being configured to assign logical blocks to various tiers of the multi-tier file system.

According to another embodiment, determining the measure of access requests that will be directed to the data via the second logical block versus the first logical block may comprise receiving the measure of access requests from: a user who initiated creation of the snapshot, an application which initiated creation of the snapshot, etc.

In another embodiment, method 1000 may include determining an access request count for the first logical block based on the proportion of the heatmap value for the data that is to be directed to the first logical block, determining an access request count for the second logical block based on the proportion of the heatmap value for the data that is to be directed to the second logical block, and assigning the first logical block and/or the second logical block to an appropriate tier of the multi-tier file system according to the access request count for the first logical block and the access request count for the second logical block.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a field programmable gate array (FPGA), etc. By executable by the processor, what is meant is that the logic is hardware logic, software logic such as firmware, operating system, etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for managing data, the method comprising:
receiving a request to write data to a file block on a multi-tier file system, wherein a first logical block is associated with the file block;
determining whether the request is a first write request for the file block after creation of a snapshot of the file block;
in response to a determination that the request is the first write request for the file block after creation of the snapshot of the file block:
creating a second logical block according to copy-on-write processing;
determining a measure of access requests to be directed to a logical block allocated for the snapshot versus a logical block allocated for new data on the file block, wherein the logical block allocated for the snapshot and the logical block allocated for new data on the file block are uniquely chosen from: the first logical block and the second logical block;
determining whether to send the measure of access requests to an automatic tiering module; and
sending the measure of access requests to the automatic tiering module in response to a determination to send the measure of access requests to the automatic tiering module.

2. The method as recited in claim 1, wherein in response to a determination that the request is not the first write request for the file block after creation of the snapshot of the file block, normal write processing is performed.

3. The method as recited in claim 1, wherein the determining the measure of access requests to be directed to the logical block allocated for the snapshot versus the logical block allocated for new data on the file block further comprises:
receiving the measure of access requests from: a user who initiated creation of the snapshot, or an application which initiated creation of the snapshot.

4. The method as recited in claim 1, further comprising:
receiving the measure of access requests;
determining an access request count for the first logical block prior to creation of the snapshot;
determining whether all access requests are to be directed to the second logical block allocated for new data on the file block;
in response to a determination that all access requests are to be directed to the second logical block allocated for new data on the file block:
assigning an access request count for the second logical block as the access request count for the first logical block; and
resetting the access request count for the first logical block;
in response to a determination that not all access requests are to be directed to the second logical block allocated for new data on the file block:
assigning the access request count for the first logical block as a current access request count for the first logical block multiplied by the measure of access requests; and
assigning the access request count for the second logical block as the current access request count for the first logical block minus the access request count for the first logical block prior to creation of the snapshot.

5. The method as recited in claim 4, wherein the determining the access request count for the first logical block prior to creation of the snapshot further comprises retrieving the access request count for the first logical block from a first storage construct accessible to the automatic tiering module.

6. The method as recited in claim 4, further comprising assigning the first logical block and the second logical block to an appropriate tier of the multi-tier file system according to the access request count for the first logical block and the access request count for the second logical block.

7. The method as recited in claim 4, wherein in response to a determination that the first logical block currently resides in a higher tier of the multi-tier file system and in response to a determination that all access requests are to be directed to the second logical block allocated for new data on the file block, the method further comprises evicting the first logical block from the higher tier and reassign the first logical block to a lower tier.

8. The method as recited in claim 1, further comprising:
creating the snapshot of the file block in response to receiving a request to create the snapshot, wherein the request to create the snapshot comprises an access parameter, and wherein the measure of access requests to be directed to the logical block allocated for the snapshot versus the logical block allocated for new data on the file block is determined based at least partially on the access parameter.

9. A method for managing data, the method comprising:
receiving a request to write data to a file block on a multi-tier file system, wherein a first logical block is associated with the file block;
determining whether the request is a first write request for the file block after creation of a snapshot of the file block; and
determining an access request count for the first logical block prior to creation of the snapshot by retrieving the access request count for the first logical block from a snapshot data table accessible to an automatic tiering module.

10. The method as recited in claim 9, wherein in response to a determination that the request is the first write request for the file block after creation of the snapshot of the file block:
creating a second logical block according to copy-on-write processing; and
determining a measure of access requests to be directed to a logical block allocated for the snapshot versus a logical block allocated for new data on the file block by receiving the measure of access requests from: a user who initiated creation of the snapshot, or an application which initiated creation of the snapshot, wherein the logical block allocated for the snapshot and the logical block allocated for new data on the file block are uniquely chosen from: the first logical block and the second logical block.

11. The method as recited in claim 10, wherein in response to the determination that the request is the first write request for the file block after creation of the snapshot of the file block:
- determining whether to send the measure of access requests to the automatic tiering module; and
- sending the measure of access requests to the automatic tiering module in response to a determination to send the measure of access requests to the automatic tiering module.

12. The method as recited in claim 10, further comprising:
receiving the measure of access requests;
determining whether all access requests are to be directed to the second logical block allocated for new data on the file block;
in response to a determination that all access requests are to be directed to the second logical block allocated for new data on the file block:
- assigning an access request count for the second logical block as the access request count for the first logical block; and
- resetting the access request count for the first logical block;

in response to a determination that not all access requests are to be directed to the second logical block allocated for new data on the file block:
- assigning the access request count for the first logical block as a current access request count for the first logical block multiplied by the measure of access requests;
- assigning the access request count for the second logical block as the current access request count for the first logical block minus the access request count for the first logical block prior to creation of the snapshot; and
- in response to a determination that the first logical block currently resides in a higher tier of the multi-tier file system, evicting the first logical block from the higher tier and reassign the first logical block to a lower tier.

13. The method as recited in claim 12, wherein in response to the determination that the first logical block currently resides in a higher tier of the multi-tier file system and in response to the determination that all access requests are to be directed to the second logical block allocated for new data on the file block, the method further comprises evicting the first logical block from the higher tier and reassigning the first logical block to a lower tier.

14. The method as recited in claim 10, further comprising:
- creating the snapshot of the file block in response to receiving a request to create the snapshot, wherein the request to create the snapshot comprises an access parameter, wherein the measure of access requests to be directed to the logical block allocated for the snapshot versus the logical block allocated for new data on the file block is determined based at least partially on the access parameter; and
- assigning the first logical block and the second logical block to an appropriate tier of the multi-tier file system according to the access request count for the first logical block and the access request count for the second logical block.

15. The method as recited in claim 9, wherein in response to the determination that the request is not the first write request for the file block after creation of the snapshot of the file block, performing normal write processing.

* * * * *